United States Patent
Morronigiello et al.

(10) Patent No.: US 6,901,318 B1
(45) Date of Patent: May 31, 2005

(54) METHOD OF MANAGEMENT OF MAINTENANCE ACTIVITIES FOR VEHICLES

(75) Inventors: Anthony Joseph Morronigiello, Indialantic, FL (US); Steven Peter Grant, Melbourne, FL (US); Timothy Glenn Foland, Melbourne, FL (US)

(73) Assignee: Northrup Grumman Corporation, Los Angeles, CA (US)

( * ) Notice: Subject to any disclaimer, the term of this patent is extended or adjusted under 35 U.S.C. 154(b) by 112 days.

(21) Appl. No.: 10/424,225

(22) Filed: Apr. 25, 2003

(51) Int. Cl.[7] .......................... G06F 19/00; G05B 23/00
(52) U.S. Cl. ............................. 701/29; 701/30; 701/33; 702/184
(58) Field of Search .............................. 701/29, 30, 32, 701/33, 35; 705/4; 702/34, 183, 184, 187

(56) References Cited

U.S. PATENT DOCUMENTS

| | | | |
|---|---|---|---|
| 4,943,919 A | | 7/1990 | Aslin et al. ............ 364/424.03 |
| 5,216,612 A | * | 6/1993 | Cornett et al. ................ 700/96 |
| 5,225,996 A | * | 7/1993 | Weber ........................ 702/187 |
| 5,552,987 A | | 9/1996 | Barger et al. .......... 364/424.06 |
| 5,680,328 A | | 10/1997 | Skorupski et al. .......... 364/550 |
| 5,828,969 A | | 10/1998 | Chamney et al. ............. 701/29 |
| 5,856,931 A | | 1/1999 | McCasland .................. 364/550 |
| 5,931,877 A | | 8/1999 | Smith et al. .................. 701/29 |
| 5,974,349 A | | 10/1999 | Levine ........................ 701/29 |
| 5,987,474 A | | 11/1999 | Sandifer ..................... 707/103 |
| 6,125,312 A | * | 9/2000 | Nguyen et al. ............... 701/35 |
| 6,192,325 B1 | | 2/2001 | Piety et al. .................. 702/84 |
| 6,418,361 B2 | * | 7/2002 | Sinex .......................... 701/29 |
| 6,725,137 B2 | * | 4/2004 | Eagleton et al. ............. 701/29 |
| 6,732,027 B2 | * | 5/2004 | Betters et al. ................ 701/29 |
| 6,748,304 B2 | * | 6/2004 | Felke et al. .................. 701/29 |
| 6,751,536 B1 | * | 6/2004 | Kipersztok et al. .......... 701/29 |
| 2002/0007289 A1 | * | 1/2002 | Malin et al. .................. 705/4 |

* cited by examiner

Primary Examiner—Tan Q. Nguyen
(74) Attorney, Agent, or Firm—Louis Dachs (57) ABSTRACT

The invention is a method of maintaining a vehicle including the steps of: 1) entering maintenance activity data for a particular type of an vehicle into a data base; 2) entering the maintenance activity data applicable to a particular vehicle of the particular type of vehicle into the database; 3) modifying the schedule for the maintenance activities based upon the severity of current use of the vehicle; 4) accessing the database and identifying items on the particular vehicle, which require maintenance activities 5) scheduling maintenance activities; 6) performing the scheduled maintenance activities; 7) documenting the maintenance activity performed on each item.

7 Claims, 8 Drawing Sheets

| ITEM TYPES | |
|---|---|
| FIND | % |

| TYPE | DESCRIPTION |
|---|---|
| AD | AIRWORTHINESS DIRECTIVE |
| BTC | BOEING ROUTINE TASK CARD |
| CPCP | CORROSION PREVENTION CONTROL PROGRAM |
| D6 | AGING AIRCRAFT PROGRAMS |
| ITC | INTEGRATED TASK CARD |
| LTC | LCS TASK CARD |
| MAP | AIRCRAFT TESTS |
| MPD | MAINTENANCE PLANNING DOCUMENT |
| MT | MAINTENANCE TIPS |
| NTC | ROUTINE TASK CARD |
| OPPS | MAINTENANCE OPERATION SHEET |
| SB | SERVICE BULLETIN |
| SL | SERVICE LETTER |
| SRP | SERVICE RELATED PROBLEM |
| SSD | SIGNIFICANT STRUCTURAL DETAILS |
| TO | TECHNICAL ORDERS |

FIND   OK   CANCEL

AIRCRAFT DATA — REFURBISHMENT — CURRENT — TOUCH AVG. CURRENT — AND HOURS/

| AC NBR | HOURS | CYCLES | MISSIONS | HOURS | CYCLES | MISSIONS | GO'S | CYCLE | VALID DATE | CONTRACT DT | COMM. PRODUCT |
|---|---|---|---|---|---|---|---|---|---|---|---|
| P16 | 35730 | 20050 | | 35730 | 20050 | | | 9.18 | 01-MAR-2001 | | |

CURRENT RCG'S | IMPACT STUDY RCG'S

| CTRL PT | CTRL VALUE | COMMENTS |
|---|---|---|
| 1 | .417 | |
| 2 | .38 | |
| 3 | .27 | |
| 4 | .877 | |
| 5 | .694 | |
| 6 | .324 | |
| 7 | .181 | |
| 8 | .394 | |
| 9 | 1 | |

UPDATE PLANE

COUNT: 1

MODE NORMAL

METHOD OF MANAGEMENT OF MAINTENANCE ACTIVITIES FOR VEHICLES

BACKGROUND OF THE INVENTION

1. Field of the Invention

The invention relates to the field of methods of vehicle maintenance management and, in particular, to a method of management that is facilitated by computer software, although the method could be accomplished manually. Furthermore, the method allows the scheduling of maintenance activities to be varied as a function of the severity of the vehicle's operation, as well as the total hours of operation.

2. Description of Related Art

On commercial vehicles, such as aircraft, maintenance is critical if safety standards are to be met. This requires a myriad of inspections and maintenance operations be carried out on a predetermined and often repeatable schedule. However, these scheduled operations vary not only with time, but also with the severity of vehicle operation such as the number of flight hours, aircraft cycles (landing and takeoffs), average hours per cycle, and a great many other factors. In addition, either governing agencies or individual operators may require special inspections or modifications. For example, the FAA may issue an Airworthiness Directive dictating an inspection or modification immediately. As a result of the dynamic nature of vehicle maintenance, one can not just set up a program, put in the scheduled tasks and complete them as a function of a re-set due date. Continuous monitoring and update is required to ensure safety and efficiency.

U.S. Pat. No. 4,943,919 "Central Maintenance Computer System And Fault Data Handling Method" by M. J. Aslin, et al. discloses a system for only the monitoring of line replaceable units (LRUs). U.S. Pat. No. 5,552,987 "Aircraft Engine Cycle Logging Unit" by R. R. Barger, et al., addresses engine maintenance only, specifically engine cycle monitoring. U.S. Pat. No. 5,680,328 "Computer Assisted Driver Vehicle Inspection Reporting System" by J. H. Skorupski, et al. discloses an electronic record keeping system for federally regulated pre and post trip inspection data. It is a simple data collection system. U.S. Pat. No. 5,828,969 "Process For Use With Aircraft Repairs" by L. J. Chamney, et al., discloses a system for the repair of damage, with no provision for maintenance management. Also of interest is U.S. Pat. No. 5,856,931 "Method And System For Identifying Organizing, Scheduling, Executing, Analyzing And Documenting Detailed Inspection Activities For Specific Items In Either A Time-based Or On-Demand Fashion" by M. McCasland. This invention discloses a targeting and tracking system for a high volume of fixed equipment requiring regular, predicable and simple scheduled maintenance with predefined solutions to discovered problems.

U.S. Pat. No. 5,931,877 "Advanced Maintenance System For Aircraft and Military Weapons" by C. A. Smith, et al. This is an on-line repair/trouble-shooting system for aircraft/weapons. It provides technical information required to repair/trouble-shoot problems in the field. It also records the event and generates a historical database. This system is failure oriented (reactive not proactive). U.S. Pat. No. 5,987,474 "Computer Aided Maintenance And Repair Information System For Equipment Subject To Regulatory Compliance" by A. M. A. Sandifer, is directed more to a technical library rather than a maintenance management tool. It contains many regulatory documents that are not requirements for maintenance and excludes all non-regulatory documents that are required for maintenance. Inspection records are for regulatory compliance only. Additionally, this system will only list the compliance records that have been created but does not generate next due reports, and it is not flexible with respect to user defined requirement or adjustment of inspection intervals based on the operators use of the equipment.

U.S. Pat. No. 6,006,171 "Dynamic Maintenance Management System" by C. J. Vines, et al. provides a system that monitors fixed equipment requiring regular, predicable and simple scheduled maintenance with predefined solutions to discovered problems. The system alerts operators to failures and the data can be used to modify scheduled maintenance, making this system reactionary. Also of interest is U.S. Pat. No. 6,192,325 B1 "Method And Apparatus For Establishing A Predictive Maintenance Database" by K. R. Piety, et al. This invention monitors fixed equipment requiring regular, predicable and simple scheduled maintenance with pre-defined solutions to discovered problems. The system alerts operators to failures and the data can be used to modify scheduled maintenance, making this system reactionary. Input consists of the operational characteristics, not the mandatory refurbishment/inspection requirements; maintenance predominately determined by alerts to non-characteristic operations.

Thus, it is a primary object of the invention to provide a process for insuring that all inspection, maintenance and repair on a vehicle is performed as required, and electronically logged if so desired.

It is another primary object of the invention to provide a process wherein the required inspection and maintenance can be adjusted based on the individual vehicle's usage severity. This is of prime importance for vehicles which may require lengthy maintenance procedures at a high cost to the operator, or where lack of availability of the vehicle creates a situation of extreme loss of functionality to the operator, or where usage becomes a safety issue.

SUMMARY OF THE INVENTION

In general terms, the invention is a vehicle maintenance management process including the steps of:
1. Entering maintenance data for a specific vehicle type and model into a database. This involves entering maintenance task instructions, general vehicle applicability, maintenance task intervals and options, zones affected in the performance of the maintenance task, and links to all related tasks and documents.
2. Entering the maintenance activity data relating to a particular vehicle into the database. At a minimum, the last known occurrence of compliance with a particular maintenance task must be entered.
3. Modifying the maintenance interval of a specific task based upon the severity of use of the vehicle. A system of interval scaling factors associated with usage control point locations are used in this particular embodiment to ensure that each task interval is properly modified based upon its location on the vehicle and the impact of usage at that location.
4. Accessing the database and identifying maintenance tasks that are required to be accomplished in upcoming maintenance events.
5. Scheduling maintenance tasks for the next maintenance event. This is based upon the results of step 4, but may also include phased tasks. Phased tasks are tasks that are not currently due but whose inclusion in a maintenance event is done for the purpose minimizing schedule impacts over the entire maintenance lifecycle of the vehicle and to maximize efficiency by taking advantage of component accessibility. Preferably, Step 5 includes the steps of: reviewing the results of Step 4; identifying or flagging maintenance tasks to be performed; integrating the phased maintenance tasks; and creating open inspection cards that specify the specific work instructions necessary for completion of the task and that require Quality Assurance completion when the task is verified as completed.

6. Performing the Maintenance Activities.
7. Documenting that the maintenance activities have been performed. In addition, the performance of maintenance activities can be monitored.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

DESCRIPTION OF THE PREFERRED EMBODIMENT

Figure 1:
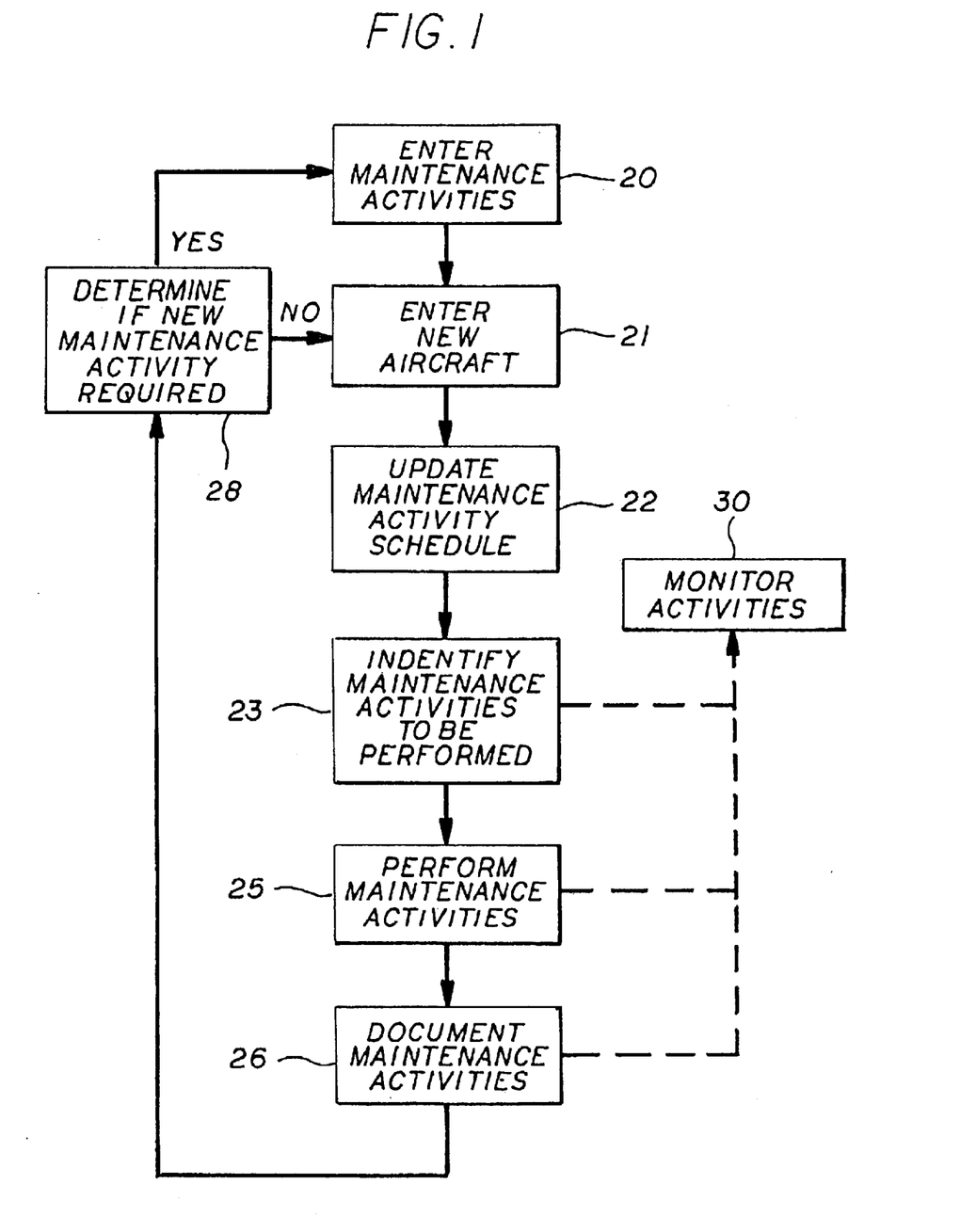
FIG. 1 is a top-level flow chart of the subject method.

Referring to FIG. 1, the invention is a maintenance management process for vehicles. The high level of complexity associated with aircraft maintenance inspired the use of the aircraft industry as a basis for the development of this invention. Maintenance activities include, but are not limited to, inspection, maintenance, refurbishment, replacement and modification of items on the aircraft.

Currently, only the Boeing 707-300C series aircraft are fully supported in the database although the invention is applicable to all vehicles. If a vehicle to be inspected and/or maintained is not presently supported by the database, i.e. a Boeing 737 or an Airbus A300 aircraft, then the following steps may be enacted after accessing the database.

Step 20 Enter the maintenance tasks for the aircraft model. This includes:

1. Entering task card instructions (detailed inspection requirements).
2. Entering general aircraft affectivity.
3. Entering inspection requirements (intervals, techniques, etc.).
4. Entering zone location (the location on the aircraft)
5. Entering related document links.
6. Attaching multimedia links. With this information, any model of this aircraft can be maintained.

Step 21—New Aircraft Entry. If a particular aircraft of a model now supported by the database has not been previously maintained using this process, it is now added to the database. This requires that the following be accomplished.

1. Entering the identification numbers (e.g. line, serial, tail) of the new aircraft.
2. Marking all affected task cards as applicable.
3. Entering the complete aircraft history into the database (all previously performed inspections and maintenance activities).

Step 22—Udate Maintenance Activity Schedule. The original manufacturer (such as Boeing Aircraft Corporation) provides recommended maintenance activity requirements based upon typical aircraft usage. This is usually based upon commercial passenger and cargo carrying applications, which are consistent with all the airlines. However, aircraft used in other roles, such as found in the military, differ greatly and maintenance activities may have to occur with more or less frequency. For example, military touch and go training flights involve multiple landings over a short period of time. This usage has a significant impact on wing, engine, tail and landing gear structure, when compared to commercial usage. The severity factors would be increased and more frequent inspections would be required to maintain safety.

In contrast, cargo transport type aircraft usually are involved in long flights and fewer landings. Thus, the interval between maintenance activities can be increased. For example, Boeing Corporation assumes that the average flight of their Model 707-300 aircraft is 2.8 hours. If the actual average aircraft is flying 5.6-hour flights, the landing gear inspection intervals could be cut in half. If the opposite is true, the average flight is 1.4 hours, then twice the inspections maybe required.

Another example is the monitoring of crack propagation in various structural elements of the airframe. Potential crack propagation in a particular structural element may require repeat inspections governed by the following equation:

$$\text{Next Inspection} = \text{Current Hours} + (\text{Repeat Cycles} \times \text{Avg. Hrs/Cycle} \times \text{RCG})$$

Figure 6:
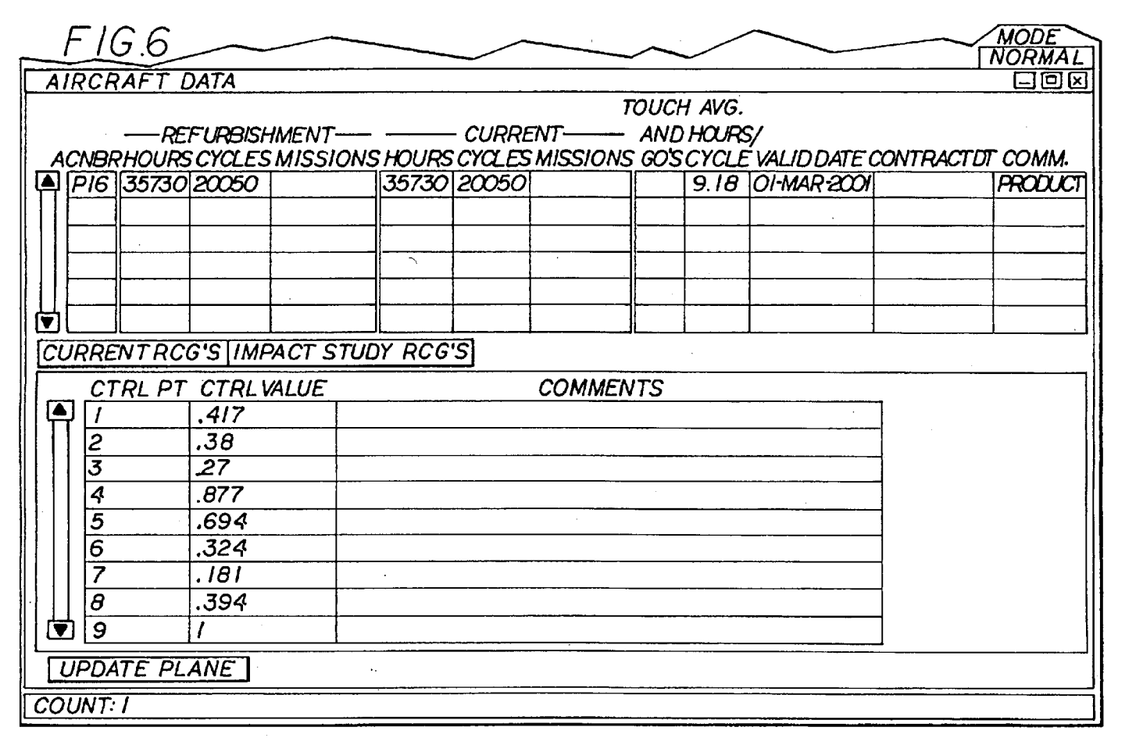
FIG. 6 is typical maintenance due computer screen.

The RCG, or Relative Crack Growth Factor, is a multiplier based on the critical nature of the structure, the size of the crack and its location. Equations using multiple flight variables are utilized to develop a crack growth life relationship between a defined baseline aircraft usage and an individual aircraft's actual usage. These factors are then applied to the baseline recommended inspection intervals to either increase or decrease the frequency of required inspections. In the screen presented in FIG. 6, aircraft P16 has an average hours per cycle of 9.18 hours and its last inspection was at 35,730 total hours. Thus, assuming that the baseline recommended inspection is 1000 cycles and the inspection is at control point 2 (Relative Crack Growth (RCG) factor of 0.38), the next inspection should be at:

$$35730 + (100 \times 9.18 \times 0.38) = 39{,}218 \text{ hours.}$$

If the average hours set forth by the manufacturer (2.8 Hrs) were used, the next inspection would be at 38,530 hours. Hence, inspections at this detail would occur too frequent and cost the operator time and money. In some cases, the opposite may apply and inspections may not be frequent enough. This scenario may pose safety concerns.

Step 23—Identify Maintenance Activities To Be Performed. The database is accessed to identify the required maintenance activities to be performed on the particular aircraft at the next maintenance activity event. This also involves the generation of inspection cards, which list the required inspection for the maintenance activities to be performed.

Step 25—Perform Maintenance Activities. This includes inspection, maintenance, refurbishment, replacement and upgrading of items on the particular aircraft. Monitoring is typically part of the maintenance activities, which insures that these tasks are accomplished in the right order.

Step 26—Document Maintenance Activities. This step insures that all maintenance activities are properly completed. This involves the following steps:
1. Entering and updating inspection information into the database.
2. Entering working document information into the database.
3. Entering status into the database for review.
4. Determining if inspection requirements are satisfied.
5. Closing records.
6. Completing work summary reports.

At this point the method of maintaining a vehicle is completed. However, new or modified maintenance activities may be required and the following step must be addressed, Step 27—Determine If New Maintenance Activities Required. For example, the aircraft manufacturer, or the FAA may require compliance to new or modified maintenance activities. Any new data or changes to existing data return this maintenance process flow to Step 20. If there are none, the next maintenance cycle begins at Step 21. In addition, the use of a computer-based database allows this method to be monitored by management personnel. Thus, Step 30—Monitor Activities is included in FIG. 1.

Figure 2:
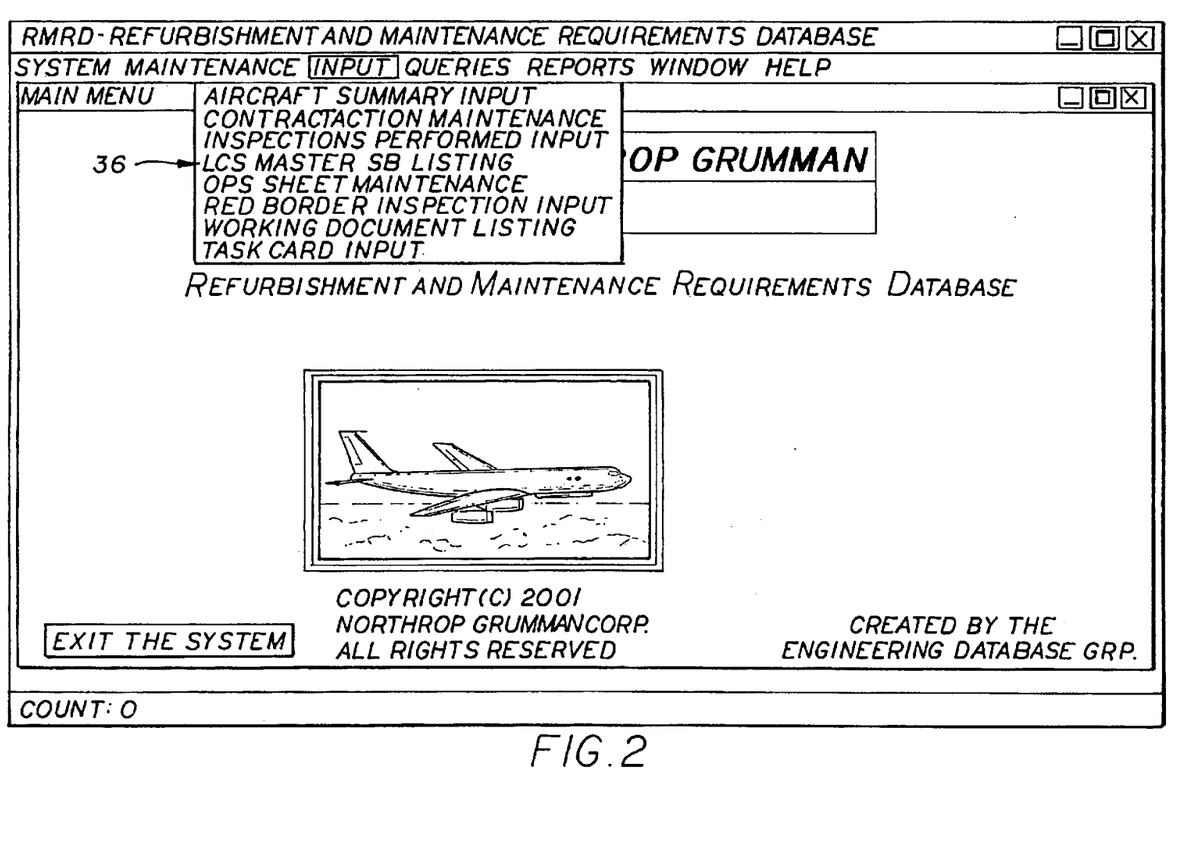
FIG. 2 is a typical main menu computer screen listing.
Figure 3A:
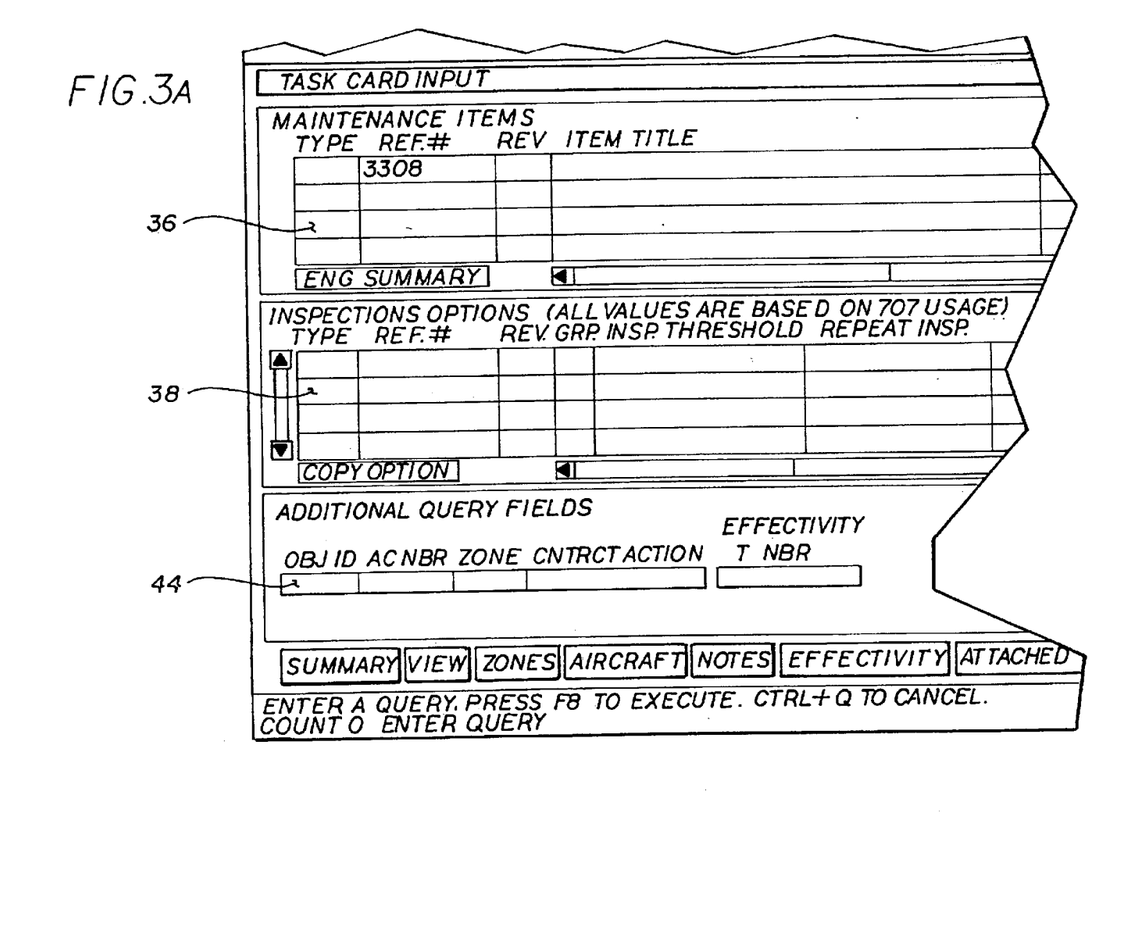
FIGS. 3 and 3B are a typical task card input screen.
Figure 3B:
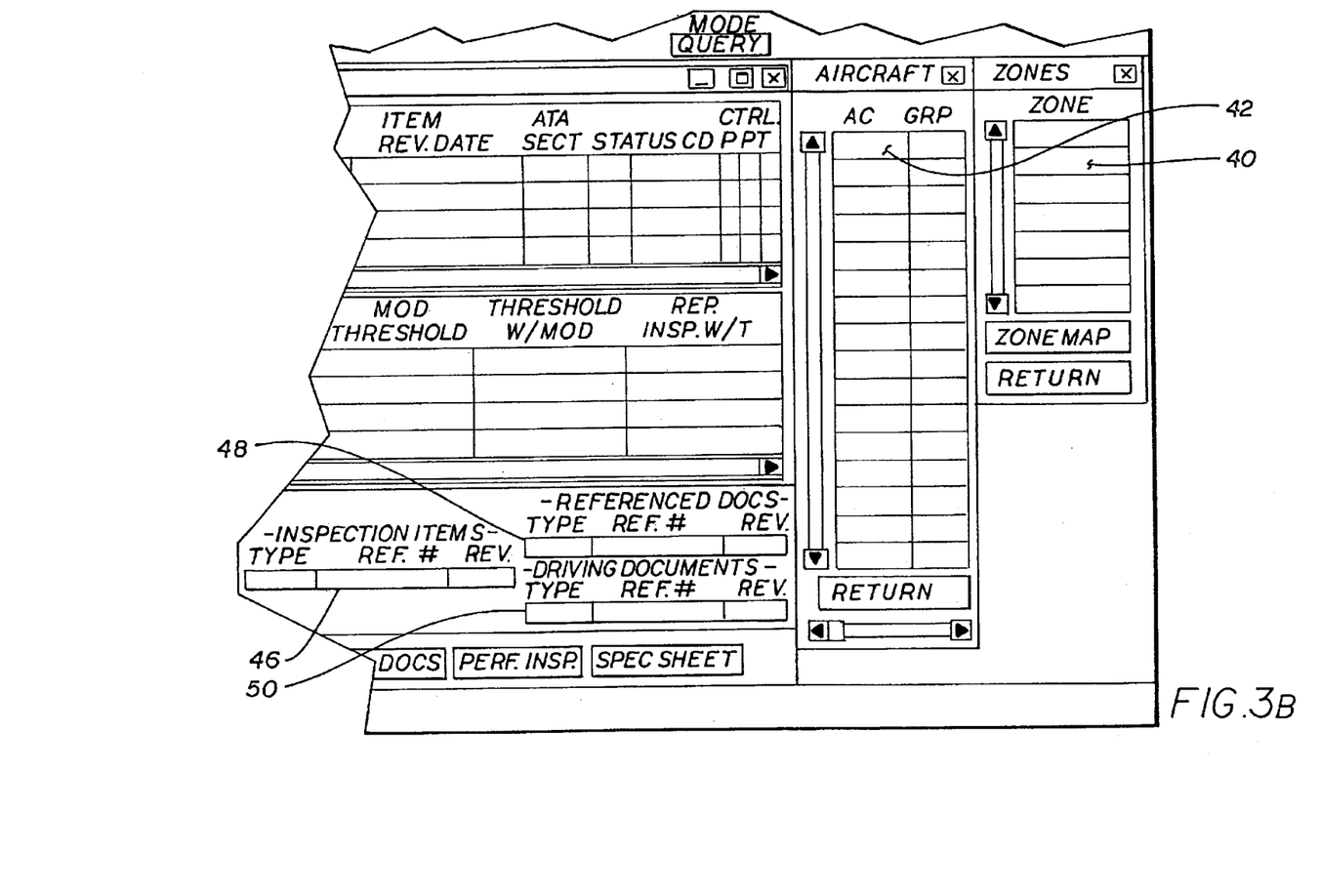
Figure 4:
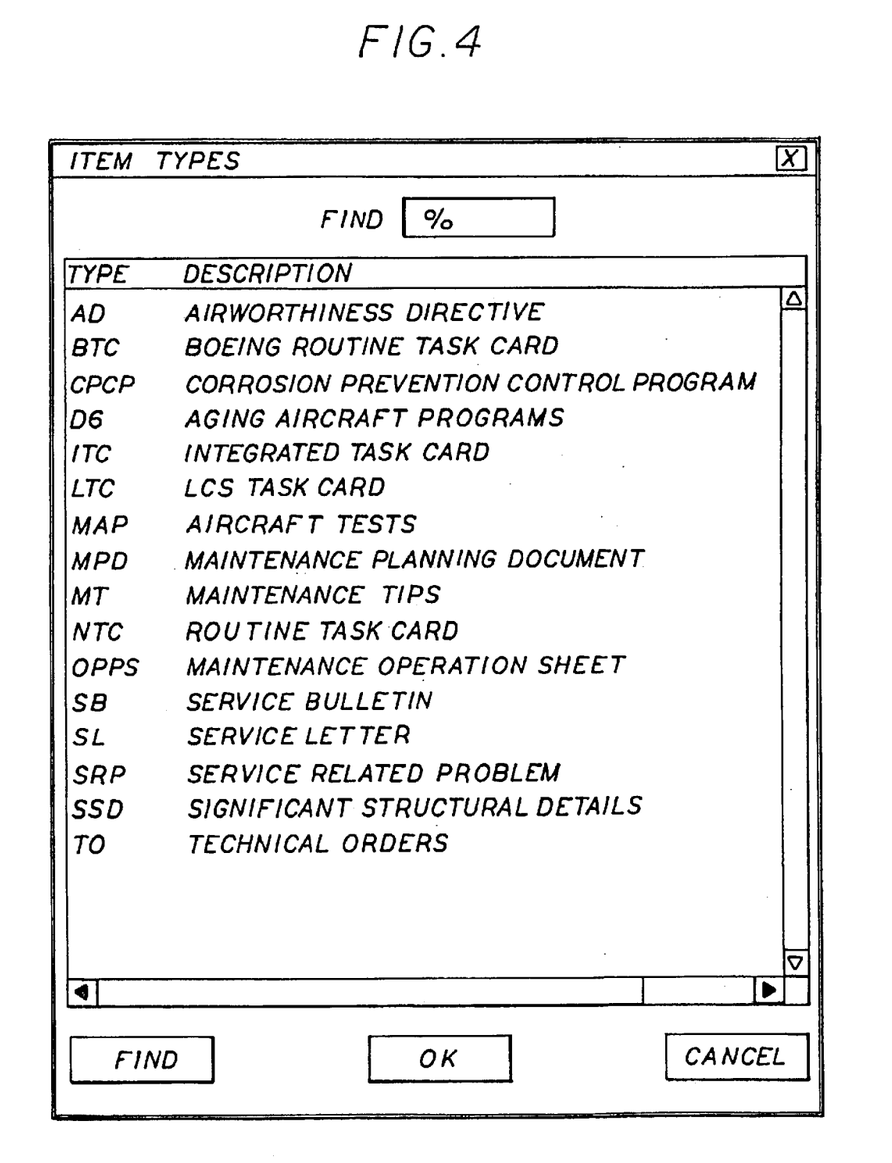
FIG. 4 is a typical task tem computer input.
Figure 5A:
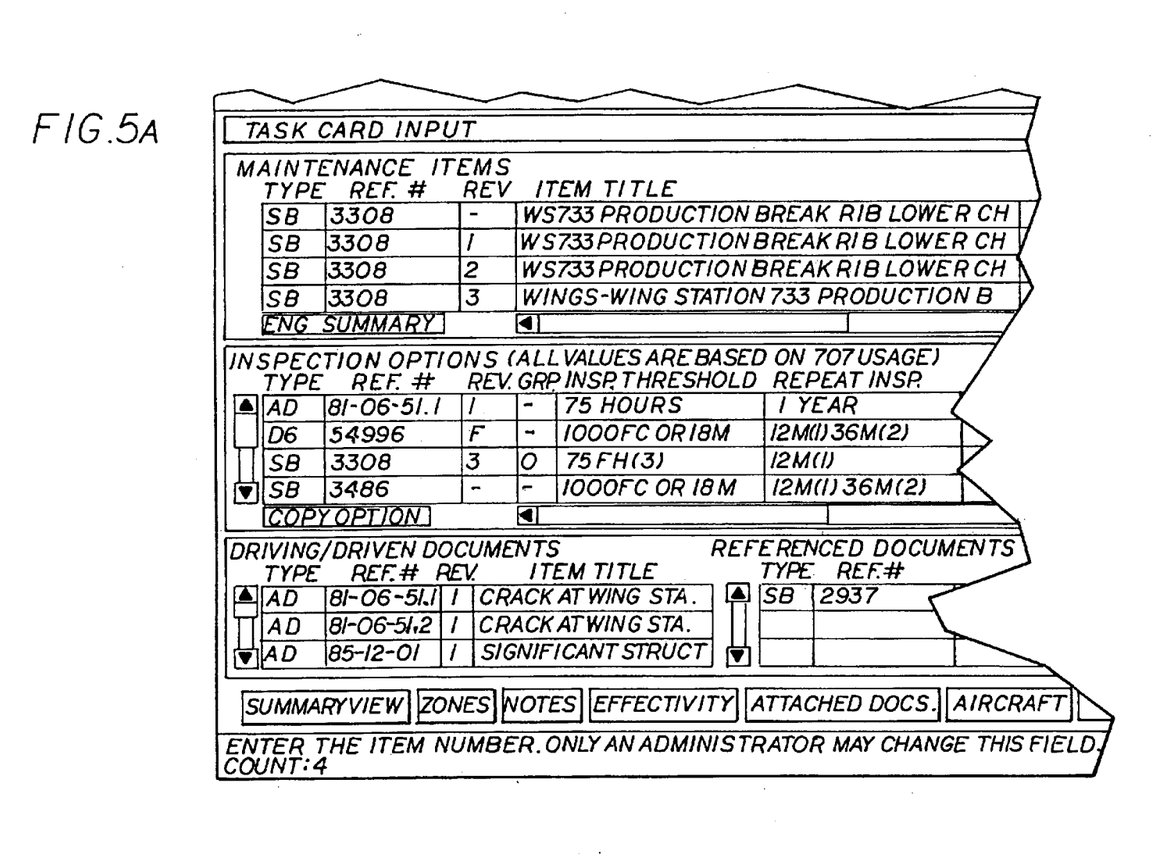
FIGS. 5A and 5B are a typical task card input screen listing maintenance items to be performed per a service bulletin.
Figure 5B:
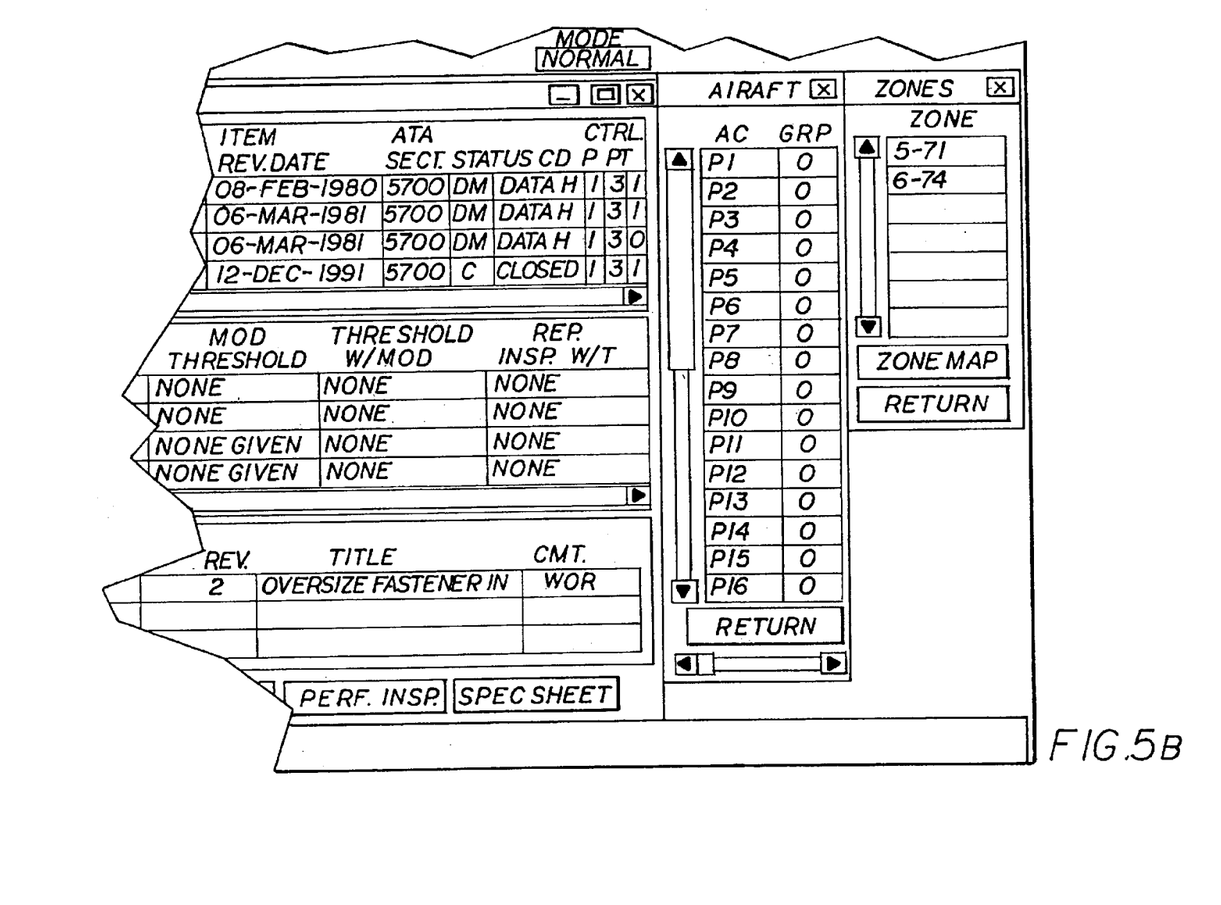

The present database, using an Oracle Corporation based database management system, is simple to use and is illustrated by the following sample of computer screens. FIG. 2 illustrates the starting screen. Note that by clicking the INPUT button, the various input options become available. FIG. 3 illustrates the TASK CARD INPUT screen. The various fields are maintenance 36, the maintenance options 38, the affected aircraft 40, aircraft zone 42, additional query fields 44, inspection items 46, reference documents 48 and driving documents 50. A double click on inspection items displays an item type listing as illustrated in FIG. 3. For example, if you enter Service Bulletin 3308, the screen provided in FIG. 4 would be displayed. Note that all pertinent data to that service bulletin appears. FIG. 5 presents the Inspection Performed Input Screen. Also, FIG. 6 shows a typical NEXT DUE REPORT (next maintenance activity due). The Oracle database, as well as other commercially available database management programs, will provide the capability to generate almost any desired input or information display screen.

Using the above method along with a computerized database allows maintenance activities on vehicles, such as aircraft, to be performed efficiently with the added capability of electronic documentation. Also, of critical importance is that the maintenance actions can be adjusted based upon aircraft usage and not some arbitrarily set time or predetermined design parameter.

While the invention has been described with reference to a particular embodiment, it should be understood that the embodiment is merely illustrative, as there are numerous variations and modifications, which may be made by those skilled in the art. Thus, the invention is to be construed as being limited only by the spirit and scope of the appended claims.

INDUSTRIAL APPLICABILITY

The invention has applicability to numerous industries (aircraft, automotive, manufacturing, etc.

What is claimed is:

1. A method of maintaining a vehicle comprising the steps of:

entering maintenance activity data for a model of an vehicle into a database;

entering the maintenance activity data relating to an individual vehicle into the database;

modifying the schedule for the maintenance activities based upon the usage severity of the vehicle between the last scheduled maintenance activities and the current maintenance activities;

accessing the database and identifying items on the vehicle, which require maintenance activities;

scheduling maintenance activities; and documenting the maintenance activities.

2. The method as set forth in claim 1 wherein the step documenting maintenance activities includes the steps of:

confirming that the maintenance tasks have been properly performed; and, generating maintenance compliance reports on the particular vehicle.

3. The method as set forth in claim 2 wherein the step of scheduling maintenance activities, includes the steps of:

identifying maintenance tasks to be performed;

entering the specific work instructions necessary to accomplish the tasks; and creating open maintenance task cards for the vehicle.

4. The method as set forth in claim 1 wherein the step of documenting the maintenance activities includes the steps of:

entering and updating inspection information into the database;

entering working document information into the database;

entering status into the database for review;

determination if inspection requirements are satisfied;

entering the maintenance findings and actions; and entering the future maintenance requirements.

5. A method of maintaining a vehicle having previously determined maintenance history and scheduled maintenance activity requirements comprising the steps of:

modifying the schedule for the maintenance activities based upon the usage severity of the vehicle between the last scheduled maintenance activities and the current maintenance activities;

scheduling items for maintenance, performing and monitoring the scheduled maintenance on the item on the vehicle; and documenting, via electronic database, that the maintenance activity has been property performed on the vehicle.

6. The method as set forth in claim 5 wherein the step of documenting that the maintenance activities have been properly performed includes the steps of entering and update inspection information into the database;

entering working document information into database;

entering status into database for review;

determining if inspection requirements are satisfied;

entering the maintenance findings and actions; and completing work summary reports.

7. The method as set forth in claim 1 including the step of monitoring performance of the scheduled maintenance tasks.

* * * * *